United States Patent
Neugebauer et al.

(10) Patent No.: US 10,408,275 B2
(45) Date of Patent: Sep. 10, 2019

(54) COUPLING WITH A BELLOWS-PROTECTED INTERLOCKING DRIVING CONNECTION

(71) Applicant: KWD KUPPLUNGSWERK DRESDEN GMBH, Dresden (DE)

(72) Inventors: Harald Neugebauer, Goppeln (DE); Thomas Hähnel, Wilsdruff (DE)

(73) Assignee: KWD KUPPLUNGSWERK DRESDEN GMBH, Dresden (DE)

( * ) Notice: Subject to any disclaimer, the term of this patent is extended or adjusted under 35 U.S.C. 154(b) by 112 days.

(21) Appl. No.: 15/100,125

(22) PCT Filed: Nov. 18, 2014

(86) PCT No.: PCT/DE2014/000595
§ 371 (c)(1),
(2) Date: May 27, 2016

(87) PCT Pub. No.: WO2015/078429
PCT Pub. Date: Jun. 4, 2015

(65) Prior Publication Data
US 2017/0261041 A1     Sep. 14, 2017

(30) Foreign Application Priority Data

Nov. 27, 2013 (DE) .................... 20 2013 010 596 U (51) Int. Cl.
*F16D 3/74* (2006.01)
*F16J 15/52* (2006.01)

(52) U.S. Cl.
CPC ................ *F16D 3/74* (2013.01); *F16J 15/52* (2013.01)

(58) Field of Classification Search
CPC ..................................... F16D 3/74; F16J 15/52
(Continued)

(56) References Cited

U.S. PATENT DOCUMENTS 3,953,037 A * 4/1976 Winfield, Jr. ........... E21B 33/08
                                                        277/636
4,464,128 A * 8/1984 Aso .......................... B63H 5/07
                                                        277/634 X
(Continued)

FOREIGN PATENT DOCUMENTS

DE          296 10 299         10/1996
DE          196 44 884 C1      12/1997
(Continued)

*Primary Examiner* — Greg Binda
(74) *Attorney, Agent, or Firm* — Horst M. Kasper, Esq (57) ABSTRACT

Coupling (1) with a bellows-protected interlocking driving connection (2), at least comprising a hub (3) and a sleeve (4), wherein the driving connection (2) is arranged between the hub (3) and sleeve (4), wherein the driving connection (2) is protected by a bellows (5), wherein the bellows (5) is located in a recess (6) of the hub (3) and is fastened at one end to the sleeve end region (8) and at the other end opposite the sleeve end region (8) to the hub (3), wherein the annular recess (6) is bounded at least by an annular hub inner surface (16) directed towards the driving connection (2) and by an opposite hub outer surface (9) formed with respect to the end side (11) of the hub (3), wherein there is an annular gap (10) between the sleeve end region (8) and the hub outer surface (9) of the recess (6). The intention is to avoid dust and dirt penetrating the bellows section as wave troughs and face the hub outer surface, in the recess present with the hub in region bellows and hub outer surface.

16 Claims, 10 Drawing Sheets

(58) Field of Classification Search
USPC .............. 464/154, 156, 158, 159, 175, 174;
277/634
See application file for complete search history.

(56) References Cited

U.S. PATENT DOCUMENTS 4,709,789 A * 12/1987 Czich ................ F16D 55/22655
277/634
6,283,869 B1 * 9/2001 Spensberger ............. B61C 9/00
464/154 X

FOREIGN PATENT DOCUMENTS

| DE | 201 15 407 U1 | 11/2001 |
|----|---------------|---------|
| DE | 20 2006 010 830 U1 | 2/2006 |
| DE | 20 2006 010 830 U1 * | 11/2006 |
| DE | 20 2013 010 596 U1 | 11/2006 |
| DE | 20 2006 019 190 U1 | 5/2008 |
| DE | 20 2013 010 596 U1 | 2/2014 |
| WO | WO 95/27151 | 10/1995 |

* cited by examiner

COUPLING WITH A BELLOWS-PROTECTED INTERLOCKING DRIVING CONNECTION

BACKGROUND OF THE INVENTION (1) Field of the Invention

The invention relates to a coupling with a bellows-protected interlocking driving connection.

Conventional couplings with a bellows-protecting interlocking driving connection, for example, couplings with a bellows-protecting crowned gear for transmitting torques, are used for connecting a driving and a driven shaft to compensate for axial parallel, axial or angular displacements occurring between the two shafts.

(2) Description of Related Art Including Information Disclosed Under 37 CFR 1.97 and 1.98.

Figure 1:
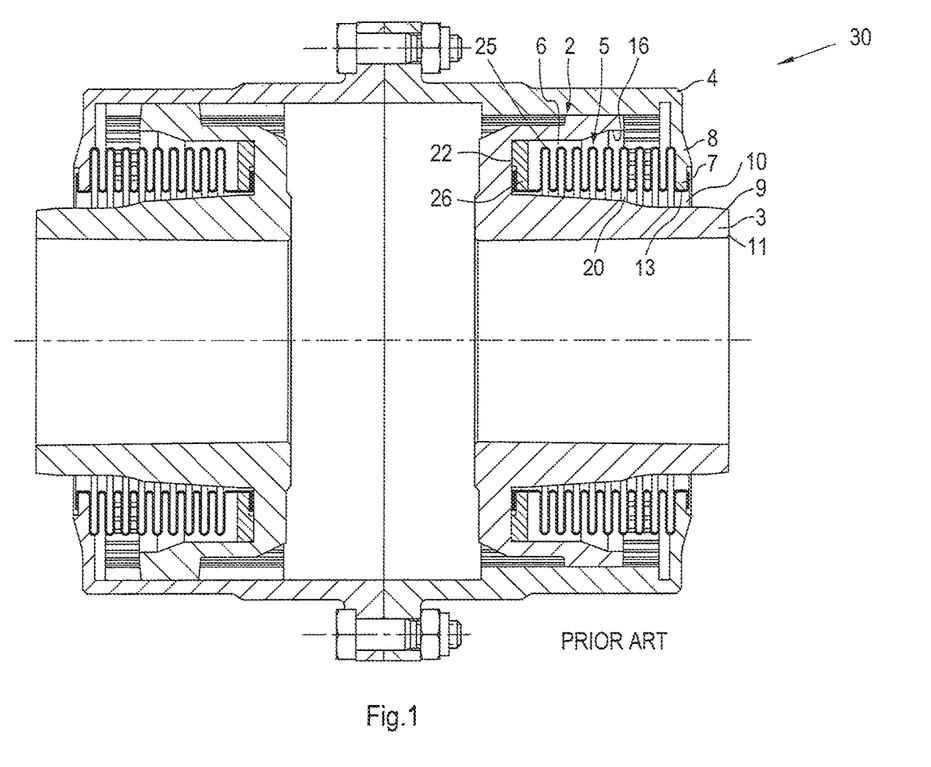
FIG. 1 is a cross-sectional view of a coupling with bellows-protecting interlocking driving connection in the form of a toothed coupling with toothing according to the prior art.
Figure 2:
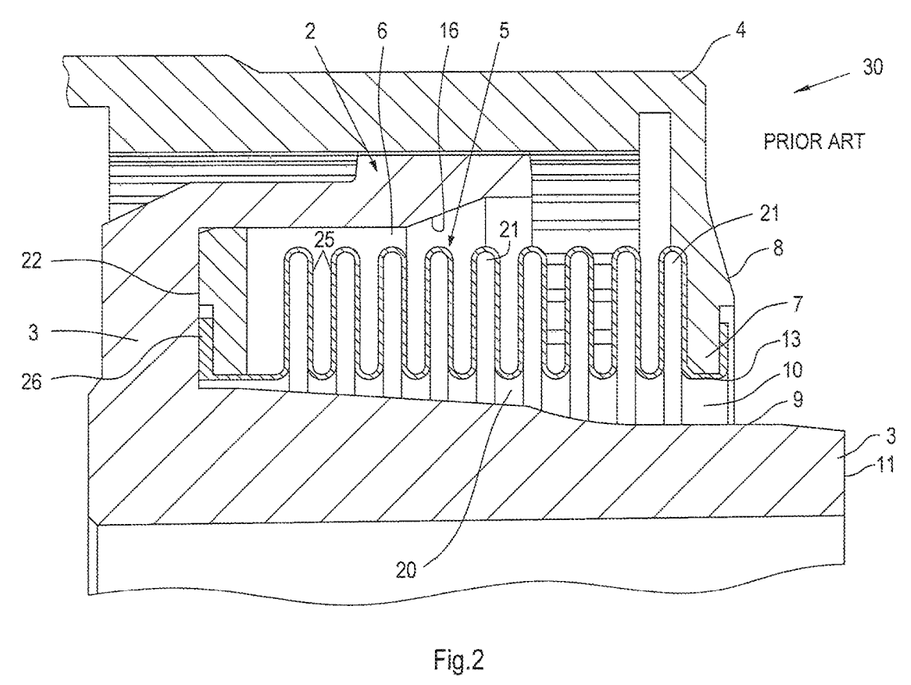
FIG. 2 is an enlarged cross-sectional view of the sleeve hub portion of the conventional gear coupling with toothing of the prior art shown in FIG. 1.

FIG. 1 is a cross-sectional view of a conventional coupling with a bellows-protecting interlocking driving connection in the form of two toothed coupling halves, comprising toothed coupling 30 with driving connection 2, used in rail vehicles according to the document DE 196 44 884134. FIG. 2 is an enlarged cross-sectional view of the sleeve hub portion of the conventional toothed coupling 30 shown with driving connection 2 and corresponding bellows-type seal for the driving connection 2 according to FIG. 1. The toothed coupling 30 comprises at least one toothed coupling hub 3 which closes sleeve 4, the driving connection 2 is arranged between the hub 3 and the sleeve 4, the driving connection 2 being protected by a bellows 5 of an annular waviness in cross-section, wherein the bellows 5 is in a recess 6 of the hub 3 in the form of a cavity, and one side is fastened on the sleeve end region 8 and the other side is mounted opposite the sleeve end 8 to the hub 3 at a junction 26, wherein the annular recess 6 is essentially bounded by an annular hub inner face 16 directed towards the driving connection 2 and by an opposite hub outer surface 9 formed with respect to the front side 11 of the hub 3, whereby an annular gap 10 between the sleeve end 8 and the hub outer surface 9 of the recess 6 creates a bellows free chamber 20.

BRIEF SUMMARY OF THE INVENTION

The present invention thus should not only be used for toothed couplings 30 with driving connection 2, but also for couplings with a bellows-protected driving connection 2 and the driving connection 2 associated bellows seal.

Said recess 6 of the hub 3 is restricted by the hub inner surface 16 and the hub outer surface 9, and the hub inner surface 16 and the hub outer surface 9 connect transition surface 22, fixed on one side in the region of the bellows 5. The bellows 5 is placed in the cavity of the recess 6 and, on the other side is fixed on the boundary 7 of the recess 6 almost occluding the sleeve end 8. The annular bellows 5 also provides the elastic closure for the driving connection 2 between the hub 3 and the sleeve 4. The annular gap 10 is formed between the boundary 7 of the sleeve end region 8 including the bellows mounting 13 and the hub outer surface 9.

For clarification, the wavy bellows 5 is defined as follows: The bellows 5 constitutes an annular element, whose surface is wavy in the cross section. The troughs of the bellows 5 directed to the hub outer surface 9 are referred to as bellows-element five chambers 21. The part of the recess 6 located between the bellows-element free chambers 21 and the hub outer surface 9 is hereinafter referred to as the bellows free chamber 20.

One disadvantage is that both the bellows 5 and the bellows free chamber 20, but especially the bellows-element free chambers 21 formed in the region between the bellows 5 and the hub outer surface 9 are not protected against dirt and dust particles. The bellows-element free chamber 21 emanating from the annular gap 10 is especially affected by obstructive dirt and dust particles, wherein due to the deposited particles the elasticity of the bellows members 25 is affected, thereby reducing the displacements mentioned. The dirt and dust particles deposited on the wavy side formed in the cross-sectional bellows-element free chambers 21 particularly impair the elasticity of the individual wavy bellows elements 25, which form the bellows 5.

The invention is therefore based on the task to provide a coupling with a bellows-protecting interlocking driving connection, which is designed so that the ingress of dust and dirt in the driving connection elements can be avoided, such as in the teeth facing away from the bellows free chamber, and particularly in the bellows-element free chamber which is formed by troughs in the cross section and the hub outer surface facing the region existing within the hub recess between the bellows and the hub outer surface.

The task is solved by the features of the claimed invention.

The coupling with bellows-protecting interlocking driving connection, at least comprising a hub and a sleeve, wherein the drive connection is arranged between the hub and sleeve, the drive connection is protected by a bellows, wherein the bellows is located in a recess of the hub and on the one hand on the sleeve end and on the other side fixed to the hub at a junction opposite the sleeve end, wherein the annular recess is defined by an annular hub inner surface directed towards the driving connection and an opposite hub outer surface, formed towards the end of the hub, wherein an annular gap between the sleeve end and the hub outer surface of the recess is present, wherein at least one elastic annular sealing member is arranged in the area between the wavy annular bellows with bellows elements and the hub outer surface, wherein the sealing member seals at least one of the adjacent annular gaps shaped in cross section as a trough in with a bellows element in the bellows-element free chamber.

The interlocking driving connection may be a gearing.

A first inventive elastic annular sealing element may have a specially shaped ring exterior and a specially shaped ring interior and may be fixed by the sleeve end under the bellows between the two ends of the sleeve end regions partially surrounding the oblong ring exterior of the elongated ring lip, and may have an outwardly directed elastic sealing lip in the ring interior which rests elastically and sealingly on the hub outer surface, and closes the annular gap by means of the sealing lip impression on the hub outer surface.

The first elastic sealing member may be located in one, especially in the first bellows-element free chamber, as an outer ring region, wherein said first inwardly located annular lip is fitted to the bellows-element free chamber of a bellows member partially or completely, and as an annular inner area may have the elastic sealing lip directed towards the front of the hub, The first elastic annular sealing element may consist of an elastomer such as polyurethane foam, plastic or rubber.

A second inventive elastic annular sealing element may close the annular gap, wherein the second sealing element engages with its annular outer area in at least one of bellows-element free chambers belonging to the recess bellow free chamber, wherein the annular inner portion of the second sealing member in the form of a sealing ring on the hub outer surface of the recess rests sealingly.

The second elastic annular sealing element, in particular with its outer ring portion in the form of an annular sealing lip, may engage with the next sleeve end region nearest the bellows-element free chamber to the sleeve end region to the hub of the sleeve-lying bellows free chamber.

Moreover, the sealing ring of the second sealing member may be not only rectangular or square in cross-section, but can also be formed as an elastic formed towards the face of the hub sloped elastic always on the hub outer surface contacting the sealing lip for displacements.

The second elastic annular sealing element may consist of polyethylene foam.

A third inventive elastic annular sealing member may also close the annular gap, wherein the third sealing member filled in the bellows free chamber opposite the hub of the bellows in a bellows-element free chamber, in several or in all bellows-element free chambers in the form of annular sealing lips and with its inner ring area on the hub outer surface in the form which rests contactingly and is preferably, in cross-section, a rectangular or square sealing ring.

The third elastic annular sealing member may be made of foam, in particular made of polyethylene foam material.

A fourth inventive elastic annular sealing member may be formed interconnected with the others in the ring interior, the ring exterior as ring sealing lips opposite the hub outer surface, formed in cross-section as a troughs creating additional bellows-element free chambers between bellows elements in a bellows-element free chamber, in several or in all bellows-element free chambers, wherein the sealing element with its ring interior is spaced from the hub outer surface, and wherein the occupied bellows-element free chambers are sealed and thus the bellows-element free chambers are protected.

The elastic material of the sealing members inserted into the bellows-element free chamber can adhere to the inner surface of the bellows-element free chamber or may be clamped in the bellows-element free chamber.

The fourth elastic annular sealing member may be made of foam, in particular made of polyethylene foam.

The elastic annular sealing members used may be formed into a combination sealing element by at least two of the above sealing members being combined.

With the inventive elastic annular sealing member in both the bellows, the bellows-element free chamber is especially protected from dirt and dust. Further developments and specific embodiments of the coupling according to the invention with bellows-protecting interlocking driving connection are given in the further claims.

BRIEF DESCRIPTION OF THE SEVERAL VIEWS OF THE DRAWING(S)

The invention will be explained in more detail by means of several embodiments with reference to drawings.

Shown.

Figure 3:
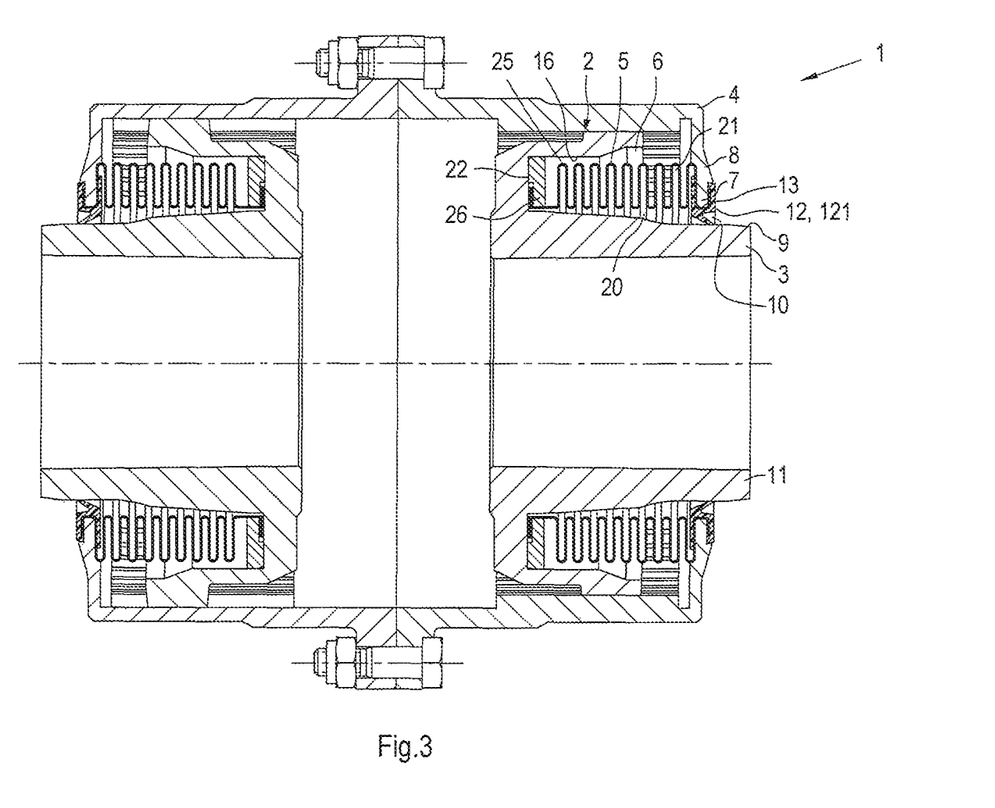
FIG. 3 is a cross-sectional view of a coupling according to the invention with bellows-protecting interlocking driving connection in the form of a toothed coupling having teeth and a first elastic annular sealing member between the bellows and the bellows opposite the hub outer surface.
Figure 4:
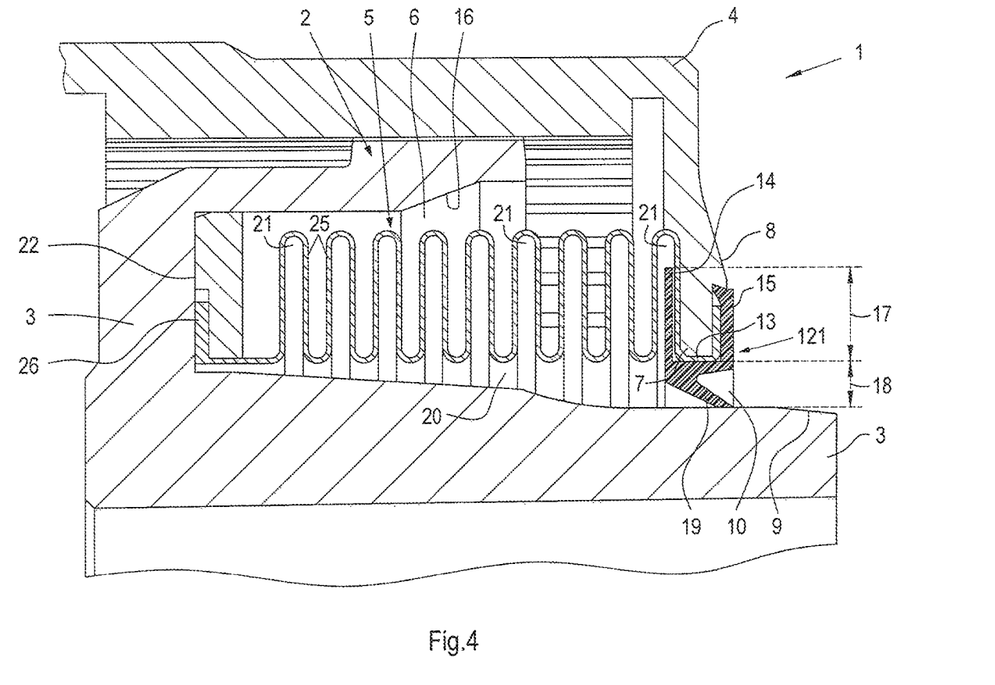
FIG. 4 is an enlarged view of the sleeve hub portion of the gear coupling according to the invention with toothing according to FIG. 3 and the first elastic annular sealing member between the bellows and the bellows opposite the hub outer surface.

In the following paragraphs FIG. 3 and FIG. 4 are considered together.

In FIG. 3 is a cross-sectional view of a coupling according to the invention with bellows-protecting interlocking driving connection in the form of with two toothed coupling halves forming gear coupling 1, each with a driving connection 2 and a respective first elastic annular sealing member 121 between the bellows 5 and the bellows 5 opposite hub outer surface 9 and in FIG. 4 is an enlarged view of the sleeve hub portion of the toothed coupling 1 according, to the invention with driving connection 2 of FIG. 3 and the first elastic annular sealing member 121 between the bellows 5 and the bellows 5 opposite hub outer surface 9 shown. Here, for clarity, only one gear coupling half is provided with reference characters.

The gear coupling 1 shown therein with driving connection 2 comprises at least one hub 3 and a sleeve 4, wherein the driving connection 2 is arranged between the hub 3 and the sleeve 4, wherein the driving connection 2 is protected by the bellows 5, the bellows 5 being in a recess 6 of the hub 3 and is on one side on the sleeve end 8 and the other side is mounted on the hub 3 opposite the sleeve end 8 at a junction 26, wherein the annular recess 6 is bounded by an annular hub inner face 16 directed towards the driving connection 2 and, to the front side 11 of the hub 3, a hub outer surface 9, whereby an annular gap 10 between the sleeve end 8 and the hub outer surface 9 of the recess 6 is present and opens a bellows free chamber 20.

DETAILED DESCRIPTION OF THE INVENTION

According to the invention an elastic annular sealing member 12, 121, 122, 123, 124 is arranged in the region between the bellows 5 and the hub outer surface 9, wherein the sealing member 12, 121, 122, 123, 124 at least seals the ring gap 10 adjacent, in cross-section as a trough forms bellows-element free chamber 21 of the bellows element 25. At least one elastic annular sealing element 12, 121, 122, 123, 124 is disposed in the area/region between the corrugated annular bellows 5 with the bellows elements 25 and the hub outer surface 9, wherein the sealing element 12, 121, 122, 123, 124 seals at least one of the annular gap 10 adjacent, wavy in cross section bellows element free chambers 21 of the bellows element 25.

First in FIG. 3 and enlarged in FIG. 4 is shown an elastic annular sealing member 121 formed such that it closes the annular gap 10 between sleeve end 8 and the hub outer surface 9 of the hub 3.

The recess 6 of the hub 3 is restricted by the driving connection 2 turned away from hub inner surface 16, one of the driving connection 2 teeth facing hub outer surface 9 and transition surface 22 located between the hub inner face 16 and the hub outer surface 9 at a junction 26, and is fixed in the region of the bellows 5 on the side. The bellows 5 is placed in the annular cavity of the recess 6 and, on the other side, on the boundary 7 of the sleeve end area 8 is attached by means of a bellows mounting 13. The annular bellows 5 is a protective closure for the driving connection 2 between the hub 3 and the sleeve 4. In order to enable the axial and radial displacements, the annular gap 10 is formed between the boundary 7 of the sleeve end area 8 and the bellows mounting 13 and the hub outer surface 9.

In particular, the bellows-element free chamber 21 are receptive susceptible to contamination which adversely affect the dynamic misalignment capability between the hub 3 and the sleeve 4.

In FIG. 4, in relation to FIG. 3, there is an enlarged representation, a first elastic annular sealing member 121 with a specially shaped annular outer portion 17 and with a specially shaped annular inner region 18 at the sleeve end 8 the incorporates the bellows mounting 13 by means of two elongated annular lips 14 and 15 at the boundary 7 of sleeve end 8 partially surrounds annular outer region 17. It has in the inner ring region 18 an outwardly directed elastic sealing lip 19 which rests elastically and sealingly on the hub outer surface 9 and closes the annular gap 10 by its sealing lip protrusion on the hub outer surface 9.

There is a free space present between the two elongated annular lips 14 and 15, into which the the boundary 7 of the sleeve end 8 fits.

In another modified embodiment (not graphically illustrated) of the first sealing element 121 it may be formed, at least in a one, particularly inside the first bellows-element free chamber 21, by the first annular lip 14, which is formed as an annular lip 23, and by the bellows-element free chamber 21 partially or fully adapted as an annular outer region 17 and formed as elastic sealing lip 19 and as an annular interior 18 directed to the end face 11 of the hub 3.

The first elastic annular sealing member 121 can consist, for example, of the elastic material polyurethane (PUR) plastic.

Figure 5:
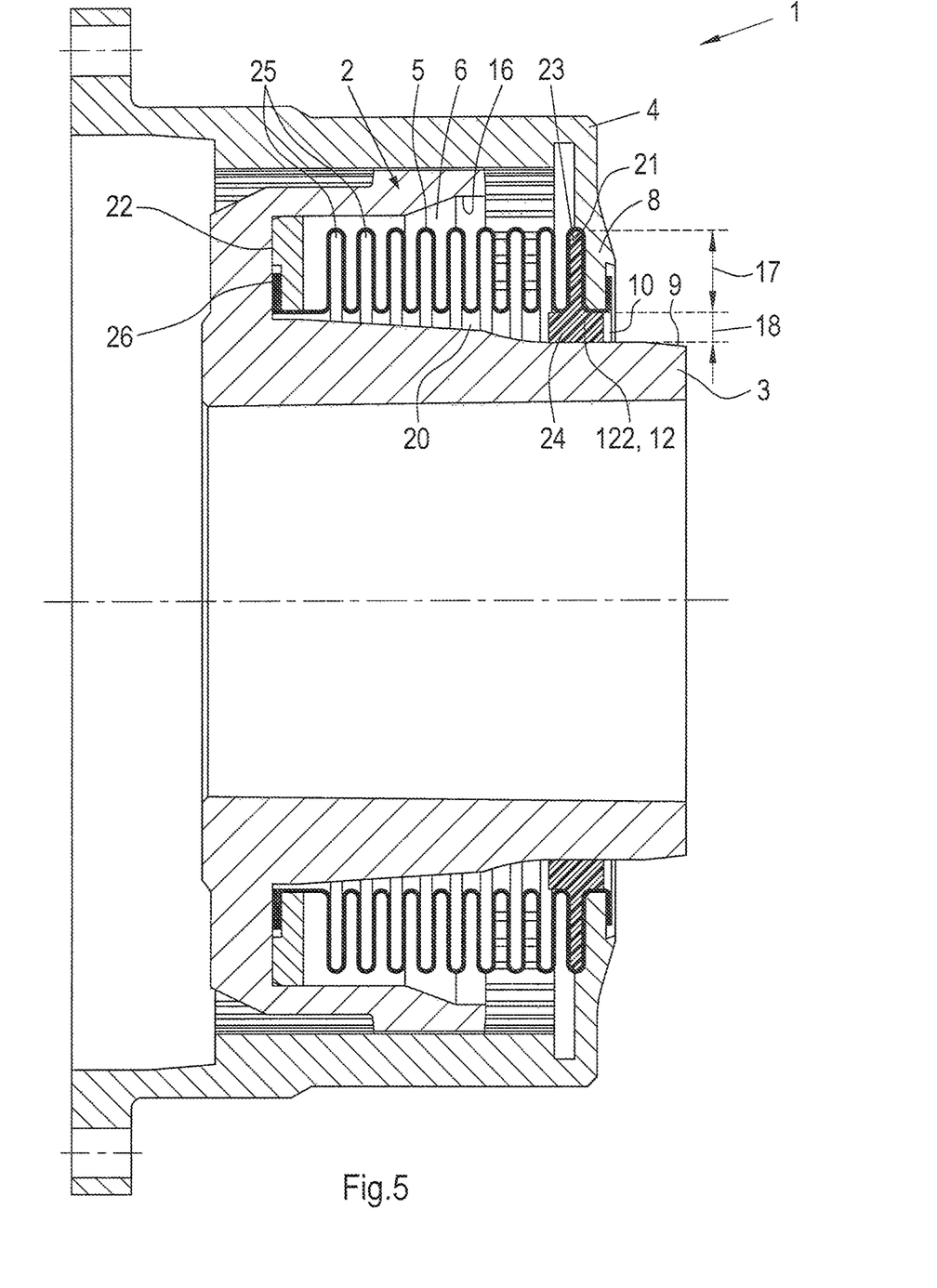
FIG. 5 is a cross-sectional view of a tooth coupling according to the invention with toothing and a second elastic annular sealing member between the bellows and the bellows opposite the hub outer surface.
Figure 6:
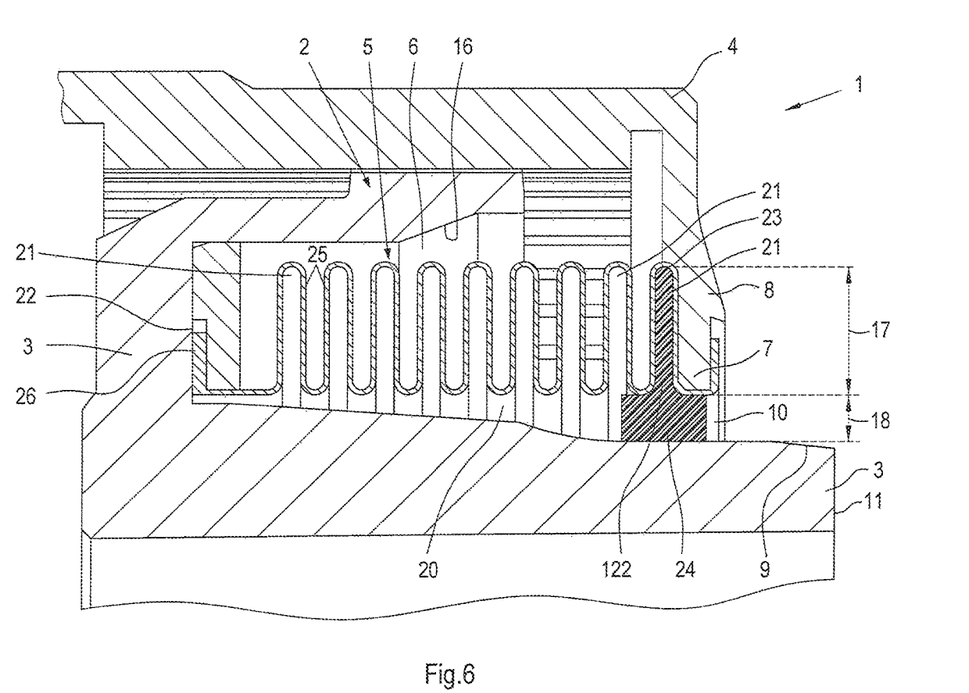
FIG. 6 is an enlarged view of the sleeve hub portion of a tooth coupling according to the invention with toothing according to FIG. 5 and the second elastic annular sealing member between the bellows and the bellows opposite hub outer surface.

The ring interior portion 18 may also form, instead of the elastic sealing lip 19 as an elastic element, a sealing ring 24 rectangular in cross section, which is connected homogeneously with the annular lip 14 as an annular outer region 17 as shown in FIG. 5 and is shown in FIG. 6, so that the following described second elastic sealing member 122 is formed.

In the following paragraphs FIG. 5 and FIG. 6 are considered together.

In FIG. 5 is a cross-sectional view of a gear coupling 1 according to the invention with driving connection 2 and a second elastic annular sealing member 122 between the bellows 5 and the hub outer surface 9 opposite the bellows 5 and in FIG. 6 is an enlarged view of the sleeve hub portion of the inventive gear coupling 1 with driving connection 2 and the second elastic annular sealing member 122 between the bellows 5 and the hub outer surface 9 opposite the bellows 5 shown.

In FIG. 6, the second elastic annular sealing element 12, 122 is shown in an enlarged sectional view in a bellows-element free chamber 21 of which bellows free chamber 20, located in the hub 3 of the sleeve end 8, is in the form of a thickened annular outer portion. 17 which fills a bellows-element free chamber 21 which engages annular lip 23, wherein the ring inner portion 8 of the elastic sealing member 122 makes contact on the hub outer surface 9 of the recess 6 in the form of an annular lip 23 opposite the sealing ring 24.

Here, the second elastic annular sealing member 122 is preferably made elastic material made polyethylene (PE).

Figure 7:
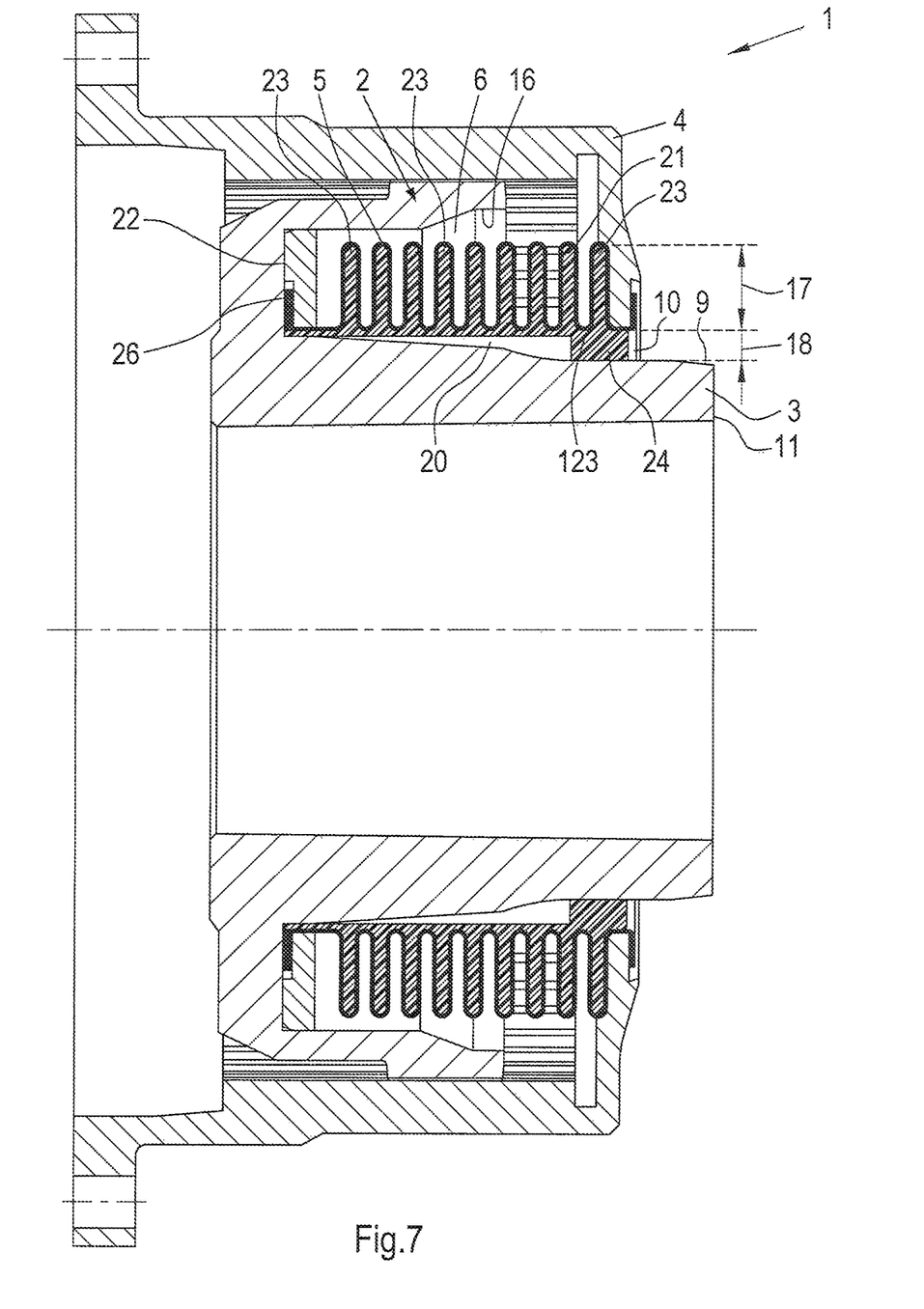
FIG. 7 is a cross-sectional view of a toothed coupling according to the invention with toothing and a third elastic annular sealing member between the bellows and the bellows opposite the hub outer surface.
Figure 8:
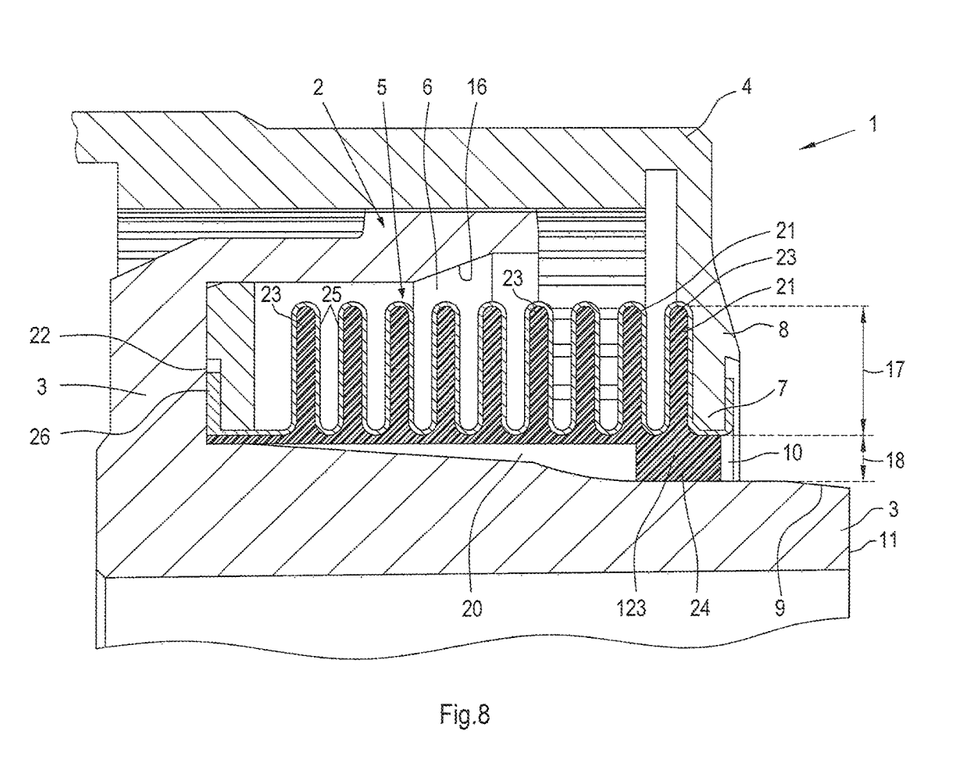
FIG. 8 is an enlarged view of the sleeve hub portion of a toothed coupling according to the invention with toothing according to FIG. 7 and the third elastic annular sealing member between the bellows and the bellows opposite the hub outer surface.

In the following paragraphs FIG. 7 and FIG. 8 are considered together.

In FIG. 7 there is a cross-sectional view of a gear coupling 1 according to the invention with driving connection 2 and a third elastic annular sealing member 123 between the bellows 5 and the bellows 5 opposite hub outer surface 9 and in FIG. 8 there is an enlarged view of the sleeve hub portion of the inventive gear coupling 1 with driving connection 2 and the third elastic annular sealing member 123 shown between the bellows 5 and the bellows 5 opposite hub outer surface 9.

In FIG. 7 and FIG. 8 is the third elastic annular sealing element 12, 123 showing overall that the bellows free chamber 20 of the hub 3 opposite of the bellows 5 at least in one bellows-element free chamber 21, and in several or in all bellows-element free chambers 21 are formed annular sealing lips 23 and which rest sealingly with their inner ring area 18 on the hub outer surface 9.

The bowels-element free chamber 21 is optionally foamed, engaging the annular sealing lips 23 which may be connected to one another inside the ring region. Of the inner ring region 18 associated sealing ring 24 is supported on the existing and interconnected ring sealing lips 23 of the hub surface 9. The sealing ring 24 can therefore be formed offset from the foamed into the bellows-element free chamber 21 and engage ring sealing lips 23. Alternatively, the PE foam ring sealing lips 23 produced can be inserted into the bellows-element free chamber 21, and thus biased.

Here, the third elastic annular sealing element 123 is made of the elastic material polyethylene (PE) foam.

Figure 9:
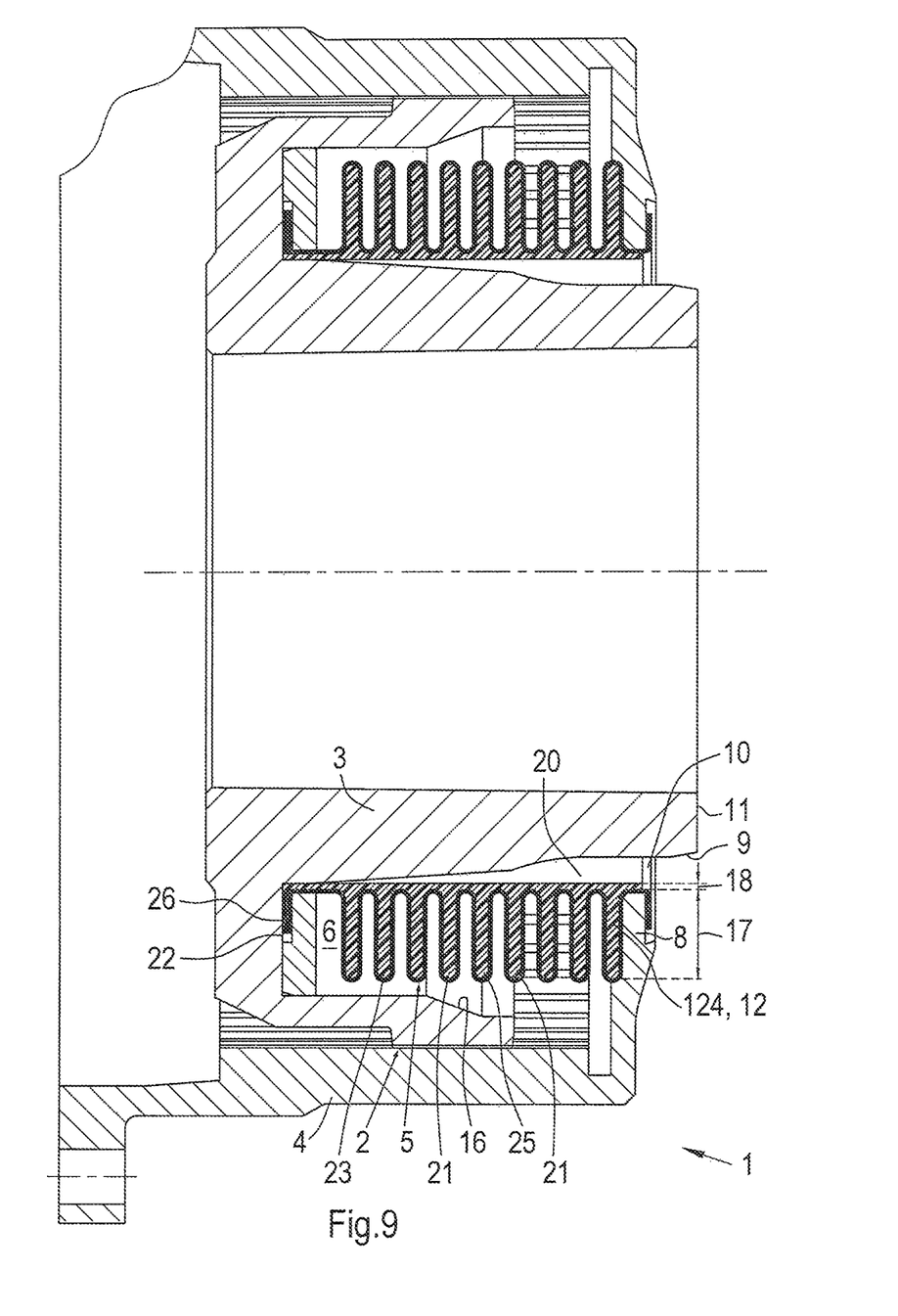
FIG. 9 is a cross-sectional view of a toothed coupling according to the invention with teeth and a fourth elastic annular sealing member between the bellows and the bellows opposite the hub outer surface, the fourth sealing member completely fills the bellows free chamber and does not rest directly on the hub outer surface, but is spaced from it at a distance.
Figure 10:
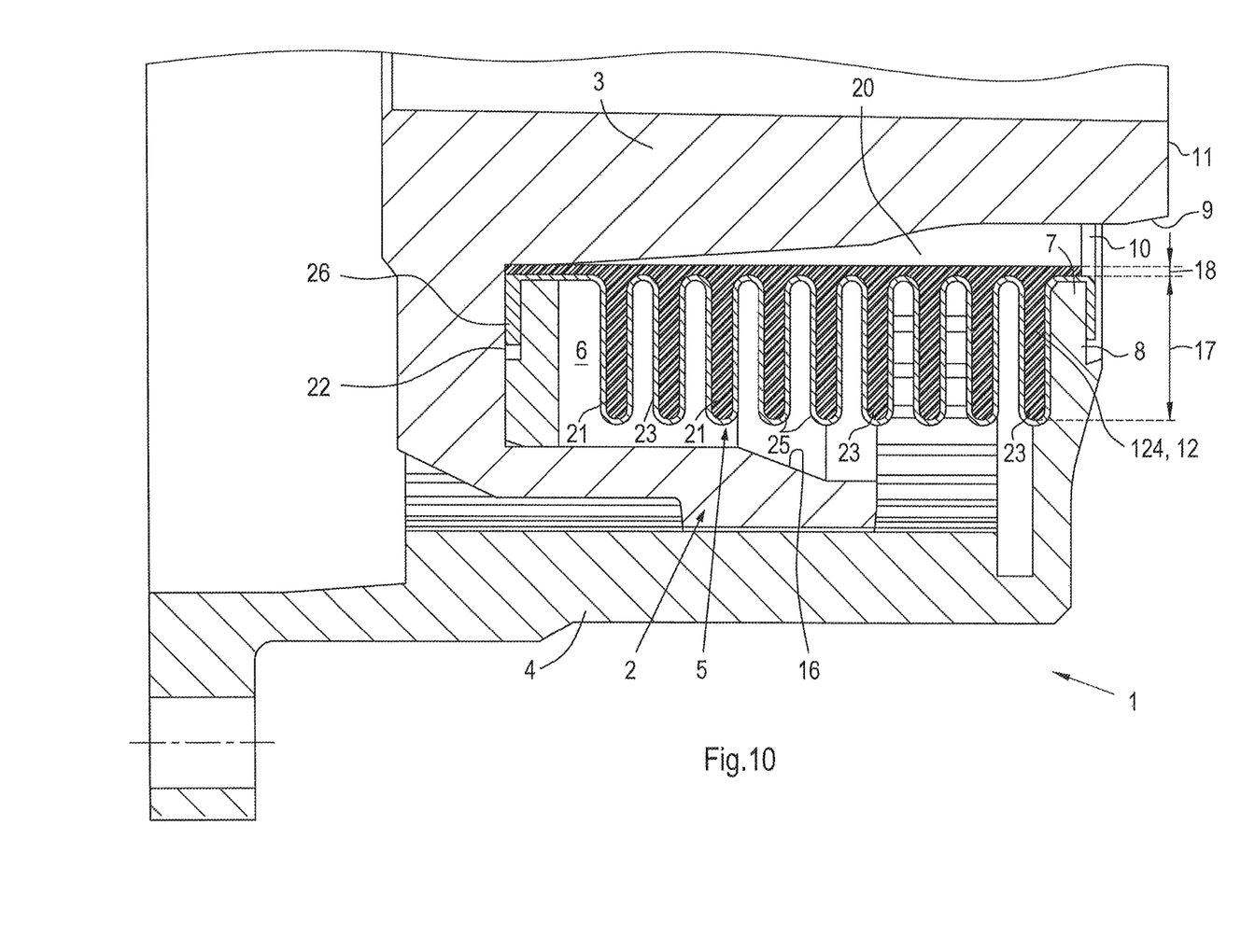
FIG. 10 is an enlarged view of the sleeve hub portion of a toothed coupling according to the invention with toothing according to FIG. 9 and the fourth elastic annular sealing member between the bellows and the bellows opposite the hub outer surface.

In the following paragraphs FIG. 9 and FIG. 10 are considered together.

In FIG. 9 is a cross-sectional view of a tooth coupling 1 according to the invention with driving connection 2 and a fourth elastic annular sealing member 124 between the bellows 5 and the bellows 5 opposite hub outer surface 9, the fourth seal member 124 completely fills the bellows-element free chamber 21 and does not directly rest on the hub outer surface 9, and FIG. 10 shows an enlarged view of the sleeve hub portion of a gear coupling 1 according to the invention with driving connection 2 of FIG. 9 and the fourth elastic annular sealing member 124 between the bellows 5 and the bellows 5 opposite hub outer surface 9.

The fourth elastic annular sealing element 12, 124 is formed with annular sealing lips 23 connected in the inner ring region 18, and forming the annular outer region 17, which preferably fill the hub outer surface 9 opposite of bellows-element free chamber 21 of the bellows members 25 is preferably filled in all bellows-element free chambers 21, wherein the sealing member 124 with its is ring inner portion 18 is spaced from the hub outer surface 9 at a distance and wherein the occupied bellows-element free chamber 21 is sealed and thus the bellows-element free chambers 21 are protected. The bellows free chamber 20 belonging to the recess 6 is therefore largely a free space without material.

The fourth seal member 124 is substantially different from the third sealing member 123 by lack of engaging the hub outer surface 9 of the sealing ring 24 or contacting a sealing lip 19.

In this case, the fourth elastic annular sealing member 123 may be also made of the elastic material polyethelyne (PE) foam made.

With the elastic annular sealing member 12 and its specified variants 121, 122, 123, 124 of both the bellows 5 in particular, the bellows-element free chamber 21 and also largely the hub outer surface 9 and the connection point 26 between the hub 3 and bellows 5 at the transition point 22 are securely protected from dirt and dust. The elastic annular sealing member 12 is essentially a bellows protector. The sealing elements 12; 121, 122, 123, 124 may be designed and manufactured so that outer ring area 17 and ring inner portion 18 are not separate parts but parts of a sealing member 12; 121, 122, 123, 124 made in one piece.

On the other hand, the sealing elements 12; 121, 122, 123, 124 can also be formed and prepared by ring outer region 17 and inner ring region 18 parts from each other separately or annular outer portion 17 and inner ring region 18 at least from at least two areas where at least one of the sealing elements 12; 121, 122, 123, 124 are joined together and preferably glued.

The elastic annular sealing member 12 may be formed into a combination sealing element by at least two combinations of the anterior-called elastic sealing members 121, 122, 123, 124 summarized.

LIST OF REFERENCE NUMBERS 1 coupling with bellows-protecting interlocking driving connection toothed coupling
2 driving, connection
3 hub
4 sleeve
5 bellows
6 recess
7 boundary
8 sleeve end/sleeve end region
9 hub outer surface
10 annular gap
11 front surface of the hub
12 elastic annular sealing member
121 first elastic annular sealing element
122 second elastic annular sealing element
123 third elastic annular sealing element
124 fourth elastic annular sealing member
13 bellows mounting
14 first ring lip
15 second ring lip
16 annular hub inner surface
17 ring outside
18 ring inside
19 sealing lip
20 bellows free chamber
21 bellows-element free chamber
22 transition surface
23 ring sealing lip
24 sealing ring
25 bellows element
26 junction gear coupling with driving connection of the prior art
30 conventional toothed coupling.

The invention claimed is:

1. Coupling (1) with a bellows-protecting form-locking drive connection (2), at least comprising
a hub (3) and a sleeve (4), wherein
the drive connection (2) is arranged between the hub (3) and sleeve (4),
wherein
the drive connection (2) is protected by a bellows (5), wherein
the bellows (5) is located in a recess (6) of the hub (3) and is fastened at one end to a side of a sleeve end region (8) and at, the other end to the the hub (3) which is oppositely oriented, wherein
the annular recess (6) is at least limited by annular hub inner surface (16) directed towards the drive connection (2) and is formed by the hub outer surface (9) and the front surface (11) of the hub (3) wherein
an annular gap (10) between the sleeve end region (8) and said hub outer surface (9) of the recess (6) is present, characterized in, that at least one elastic annular sealing element (12, 121, 122, 123, 124) is present within the region between the wave formed annular bellows (5) with a bellows element (25) and the hub outer surface (9),
wherein the sealing element (12, 121, 122, 123, 124) and the annular gap (10) adjacent seals at least one bellows element free chamber (21) of the bellows element (25) is, in cross-section, formed as a wave valley, characterized in that at least the elastic annular sealing element (12, 121, 122, 123, 124) is disposed in the area/region between the corrugated annular bellows (5) with the bellows elements (25) and the hub outer surface (9), wherein the sealing element (12, 121, 122, 123, 124) seals at least one of the annular gap (10) adjacent, wavy in cross section bellows element free chamber (21) of the bellows element (25).

2. Coupling according to claim 1,
characterized such that
the coupling (1) with bellows-protecting form-fitting drive connection (2) is a gear coupling having at least one crowned toothing with bellows sealing.

3. Coupling according to claim 1,
characterized in that,
a first elastic annular sealing element (121) with an adapted formed ring outer region (17) and with an adapted formed inner ring region (18) on sleeve end region (8) with the involvement of a bellows mounting (13) by means of two ends (7) of sleeve end regions (8) partially surrounding the ring outer region (17) of elongated ring lips (14, 15) which are fixed
and
the ring inside (18) has a elastic sealing lip (19) slanting forward and outward on the hub outer surface (9)

which elastically and sealingly rests, and by proper sealing on the hub outer surface (9), closes the annular gap (10).

4. Coupling according, to claim 3, characterized in that, the first elastic sealing element (12, 121), located in at least a first bellows element free chamber (21) as an annular outer region (17), wherein the first ring lip (14), designed as an ring sealing lip (23), that is exhibited by the bellows element free chamber (21) of a bellows element (25) is adapted partially or completely as an annular inner region (18) which the front face (11) of the hub (3) directed elastic sealing lip (19).

5. Coupling according to claim 3, characterized in that, said first elastic annular sealing element (121) is made of elastic material in the form of an elastomer.

6. Coupling according to claim 1,
characterized,
that a second resilient annular sealing element (12, 122) closes the annular gap (10) that the at least with its outer ring area (17) located in at least one of bellows element free chambers (21) in the hub (3) of the sleeve end region (8) bellows free chamber (20), wherein the ring inner portion (18) of the sealing element (12, 122) rests contacting in the form of an elastic sealing ring (24) or
in the form of an elastic sealing lip (19) on the hub outer surface (9) of the recess (6).

7. Coupling according to claim 6,
characterized,
that the second elastic annular sealing element (12, 122) closes the annular gap (10), wherein the sealing member (12, 122) at least with its outer ring region (17) located in the first sleeve end region (8) closest bellows element free chamber (21) of the hub (3) of the sleeve end regions (8) lying bellows free chambers (20) engages.

8. Coupling according to claim 6,
characterized,
that the second elastic annular sealing element (12, 122) consists of an elastic polyethylene foam material.

9. Coupling according to claim 1,
characterized,
that a third elastic annular sealing element (12, 123) closes the annular gap (10), wherein the sealing member (12, 123) fills to the hub (3) opposite bellows free chamber (20) of the bellows (5) in several or in all bellows element free chambers (21) and with its inner ring region (18) resting on the hub outer surface (9) in form of an elastic sealing ring (24) contactingly.

10. Coupling according to claim 9,
characterized,
that the third elastic annular seal element (12, 123) is made of elastic foam material.

11. Coupling according to claim 1,
characterized in
that a fourth elastic annular sealing element (12, 124) connected to itself in the annular inner region (18), forming the ring outer region (17) of annular sealing lips (23), the hub outer surface (9) opposite the bellows element free chambers (21) of the bellows elements (25) filled in at least one, several or preferably all bellows element free chambers (21), wherein the sealing member (12, 124) with its inner ring region (18) from said hub outer surface (9) is arranged at a distance and wherein the occupied bellows element free chambers (21) are sealed and thus the bellows element free chambers (21) are protected.

12. Coupling according to claim 11,
characterized,
that the fourth elastic annular seal element (12, 124) is made of elastic foam material.

13. Coupling according to claim 1,
characterized in that,
in the bellows element free chambers (21) an inserted elastic material of a sealing elements (12, 121, 122, 123, 124) is firmly fixed to the inner surface of the bellows element free chambers (21) or is clamped in the bellows element free chambers (21).

14. A coupling according to claim 1,
characterized in that
multiple sealing elements (121, 122, 123, 124) are formed and produced in such a way that a ring outer region (17) and a ring inner region (18) are separately produced region parts
and therefore
the ring outer region (17) and the ring inner region (18) consist at least of two region parts which are joined together into a sealing member (12, 121, 122, 123, 124).

15. A coupling according to claim 1,
characterized in that
a ring outer region (17) and a ring inner region (18) form parts of in each case of a single piece produced sealing element (12, 121, 122, 123, 124).

16. A coupling according to claim 1,
characterized in that
the elastic annular sealing element (12, 121, 122, 123, 124) is formed into a combination sealing element,
wherein at least two of the component sealing elements (121, 122, 123, 124) are combined at least of two elements.

* * * * *